Nathan Thompson. Imp't in Pulleys Sheaves & Wheels.

No. 119,430.                    Patented Sep. 26, 1871.

Witnesses:

119,430

UNITED STATES PATENT OFFICE.

NATHAN THOMPSON, OF BROOKLYN, NEW YORK.

IMPROVEMENT IN PULLEYS, SHEAVES, AND WHEELS.

Specification forming part of Letters Patent No. 119,430, dated September 26, 1871; antedated September 9, 1871.

*To all whom it may concern:*

Be it known that I, NATHAN THOMPSON, of the city of Brooklyn, in the county of Kings and State of New York, have invented a new and useful Improvement in Pulleys, Sheaves, and Wheels; and I do hereby declare that the following is a full, clear, and exact description of the same, reference being had to the accompanying drawing forming part of this specification, and in which—

Figure 1:
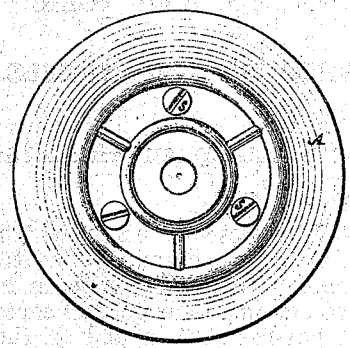
Figure 2:
Figure 3:
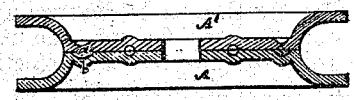
Figure 5:
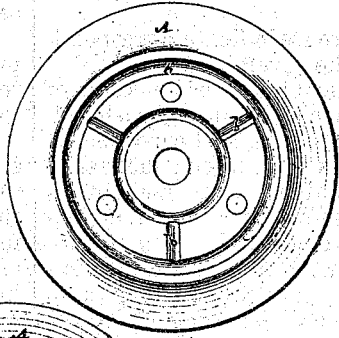
Figure 6:
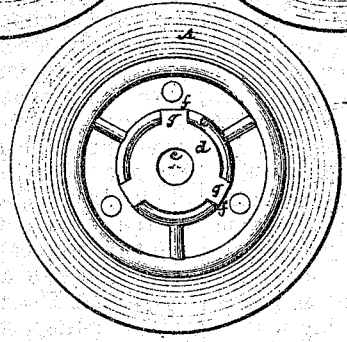
Figure 7:
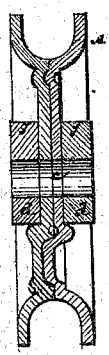

Figures 1 and 2 represent outside face and edge views of a sheave or pulley constructed in accordance with my invention; Fig. 3, a central transverse section of the same; and Figs. 4 and 5, interior face views of the two pieces or halves of which the sheave is composed. Figs. 6 and 7 represent an exterior side view and transverse section of a similar sheave with attachable bearing pieces or side hubs applied thereto.

Similar letters of reference indicate corresponding parts throughout the several figures.

My invention is applicable to various kinds of sheaves, pulleys, or wheels, including sash-pulleys, sheaves for tackle-blocks, and car-wheels.

The invention consists in a wheel, sheave, or pulley constructed in halves transversely of its axis, by stamping the same out of metal, and so that said sections are restrained, when put together, from shifting out of concentric position relatively to each other, and from turning independently of one another, by means of depressions or grooves, and correspondingly-shaped ribs or projections in the halves or sections formed by pressing or stamping out the latter. The invention also includes, in combination with a wheel or sheave thus constructed, separately attachable side hubs, constructed to fit in a concentric manner the wheel or sheave sections, and so as to turn in common with them, the same serving to form extensions of the wheel's or sheave's bearing. These attachable side hubs are mainly designed to be used when the wheel or sheave runs loose, or when revolving within a shell or case, as in tackle-blocks and certain sash-pulley arrangements, to prevent contact of the sheave or pulley beyond its hub with the shell, and to give a long bearing.

Figure 4:
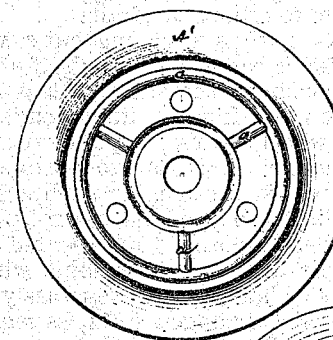

Referring to the accompanying drawing, A and A' represent the two sections or halves of a wheel, sheave, or pulley, formed by pressing or stamping them into shape, in doing which they have not only their general contour given them, but have formed in and on them respectively ribs or projections, *a*, and correspondingly-shaped grooves or depressions, *b*, which fit the one within the other, and are so arranged or shaped as to restrain the two sections A and A', when put together, from shifting out of concentric position with each other, and from turning independently of one another. To this end it is preferred to make one or more of said projections and depressions of annular form, and the others of radial or approximately radial shape and arrangement, as represented in Figs. 4 and 5 of the drawing. After the two sections A A' have been thus fitted together they may be secured by bolts or screws *s*, which the projections and depressions serve to relieve of strain.

As in thus stamping out a wheel, sheave, or pulley it would be difficult, if not impracticable, to construct the same with a hub that would form a bearing of suitable length to provide for the wheel, sheave, or pulley running loose on its spindle or shaft, and to restrain it, when working within a casing or shell, from contact with the latter beyond its central portion or hub, I further propose, as represented in Figs. 6 and 7 of the drawing, to combine with the two sections or halves A A', separately attachable side hubs *d d*, arranged to fit, as regards their bearings *c c*, in a concentric manner the outsides of said sections, and to be supported by the latter, both concentrically and against independent turning, by entering them within annular or other suitably-shaped ribs *e e* formed in stamping out the sections, and constructed, as, for instance, by breaks *f* in them, receiving wings *g* of the side hubs to hold or restrict the latter in the two respects mentioned.

What is here claimed, and desired to be secured by Letters Patent, is—

1. A pulley, sheave, or wheel made in sections A A' by stamping or pressing, as described, and formed with ribs or projections and correspondingly-shaped grooves or depressions on their inner faces, arranged to hold said sections both concentrically and from turning independently of one another, substantially as specified.

2. The combination, with a pulley, sheave, or wheel constructed in sections by stamping or pressing, as described, of the attachable side hubs $d\ d$ constructed to fit the sections $A\ A'$, and to be held by the latter both concentrically and against independent movement, essentially as herein set forth.

NATHAN THOMPSON.

Witnesses:
    FRED. HAYNES,
    U. J. TUSKA.